United States Patent [19]

Marque-Pucheu

[11] Patent Number: 5,509,028
[45] Date of Patent: Apr. 16, 1996

[54] RADIO TRANSMISSION METHOD USING REPEATER STATIONS WITH SPECTRUM REVERSAL

[75] Inventor: Gérard Marque-Pucheu, Paris, France

[73] Assignee: Matra Communication, Quimper, France

[21] Appl. No.: 216,011

[22] Filed: Mar. 21, 1994

[30] Foreign Application Priority Data

Mar. 26, 1993 [FR] France ................................. 93 03528

[51] Int. Cl.[6] ............................ H04B 3/36; H04L 25/20; H04L 25/52
[52] U.S. Cl. ................................ 375/211; 455/7; 455/53.1
[58] Field of Search .......................... 375/3.4, 1, 200, 375/211, 214, 259; 370/97, 18; 379/338, 348; 455/7, 16, 20, 53.1, 54.1, 15

[56] References Cited

U.S. PATENT DOCUMENTS

| | | | |
|---|---|---|---|
| 3,646,441 | 2/1972 | Magnuski | 375/3 |
| 4,581,765 | 4/1986 | Stec | 455/29 |
| 4,718,108 | 1/1988 | Davidson et al. | 455/20 |
| 5,060,266 | 10/1991 | Dent | 379/59 |
| 5,081,703 | 1/1992 | Lee | 455/20 |
| 5,131,010 | 7/1992 | Derrenge et al. | 375/100 |
| 5,168,522 | 12/1992 | Simanis et al. | 380/38 |
| 5,260,989 | 11/1993 | Jenness et al. | 370/94.1 |

FOREIGN PATENT DOCUMENTS 0415810   3/1991   European Pat. Off. .

OTHER PUBLICATIONS

IEEE Transactions on Vehicular Technology vol. VT-32, No. 4, Nov. 1983, New-York, US; pp. 254–259 Masahichi Kishi et al "Digital Signal Processing Spectrum Inversion for Analog Speech Channels".
"Technical Terms" 2nd edition, Daniel N. Lapedes.

*Primary Examiner*—Stephen Chin
*Assistant Examiner*—Tesfaldet Bocure
*Attorney, Agent, or Firm*—Larson & Taylor

[57] ABSTRACT

The method is used to transmit digital signals by radio over a predefined frequency band between a base station and mobile stations. At least one repeater station is used to receive radio signals transmitted by the base station and to retransmit radio signals to the mobile stations over the same frequency band. The spectrum of the radio signals transmitted by the base station to the repeater station is reversed relative to the spectrum of the radio signals retransmitted by the repeater station to the mobile stations. The invention is particularly applicable to radiotelephone communications networks.

5 Claims, 1 Drawing Sheet

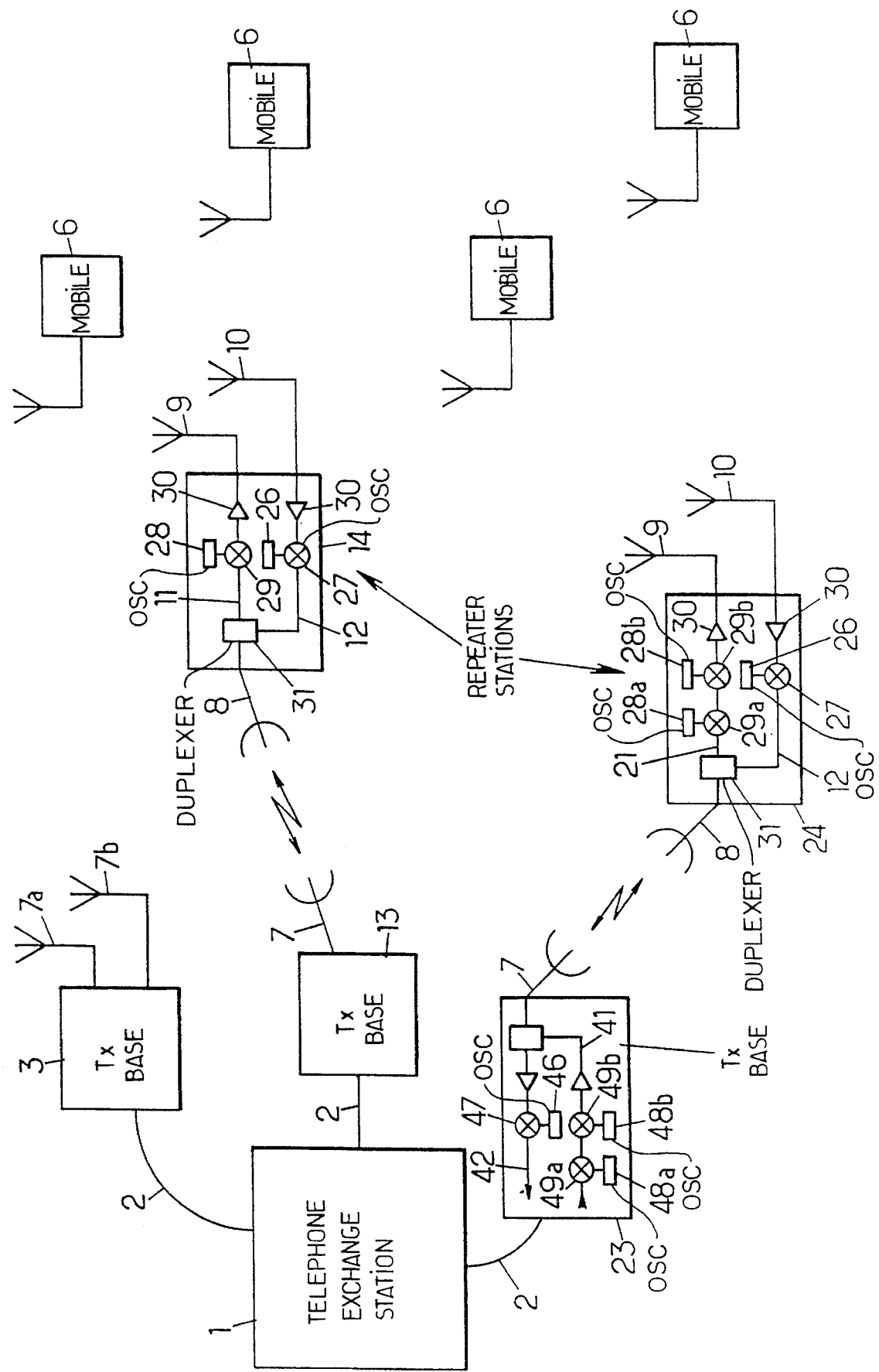

RADIO TRANSMISSION METHOD USING REPEATER STATIONS WITH SPECTRUM REVERSAL

BACKGROUND OF THE INVENTION

The present invention relates to a method of transmitting digital signals by radio over a predetermined frequency band, a repeater station for implementing the method, and a radiocommunications network using said method.

Radiocommunications networks are known that comprise a series of telephone exchange stations connected to a series of fixed base stations distributed over the territory to be covered by the communications network, each fixed base station including a radiotelephone interface member, a transmitter, and a receiver for communicating with mobile stations over a radio link.

Establishing a base station involves a certain number of constraints, in particular the presence of a mast carrying the antennas that enable radio links to be established with mobile stations, together with premises for housing the base. Such establishment also requires telephone cables to be laid for the purpose of connecting the base station to the telephone exchange stations.

Furthermore, attempts are currently being made to reduce the power and the range of mobile stations so as to limit the volume and the cost thereof. The range of mobile stations is also reduced by using higher frequencies for the radio links between mobile stations and fixed base stations. It is therefore necessary to increase the number of base stations, which solution becomes prohibitively expensive in zones of low communications density (rural zones).

One solution to that problem consists in using one or more repeater stations for one or more of the fixed base stations (see EP-A-0 415 810).

In general, the repeater stations merely comprise amplifiers connected between reception antennas and transmission antennas. Because the same radio-frequency is used for transmission and for reception, repeater stations of the above structure can be used only when the conditions of use of the repeater station provide sufficient isolation between the transmission antennas and the reception antennas. This criterion is satisfied adequately in certain cases, in particular when the zone covered by transmission from the repeater station has special radio propagation characteristics, for example in the presence of a tunnel or of some other underground works, or when the transmission antennas are devices providing localized radiation, e.g. lossy cables.

This solution is therefore unsuitable for satisfying the need mentioned above.

It is also possible to use repeater stations that implement frequency transposition. Thus, in certain applications, repeater stations are known where transposition is performed in a frequency band reserved for this type of transmission, e.g. the 38 GHz band (see EP-A-0 415 810).

However, it is often not possible to use a frequency band reserved for this purpose, in particular because of regulations. In theory, it should be possible to use available frequencies in the band reserved for communication with mobile stations. Nevertheless, that solution suffers from the major drawback of disturbing the operation of the mobile stations which may interpret a radio link established in this way between the fixed base station and the repeater stations as a radio signal intended for mobile stations.

SUMMARY OF THE INVENTION

An object of the present invention is to propose a method of transmission between fixed base stations and repeater stations that does not disturb the operation of mobile stations.

According to the invention, there is provided a method of transmitting digital signals by radio over a predefined frequency band between a base station and mobile stations, wherein at least one repeater station is used to receive radio signals transmitted by the base station and to retransmit radio signals to the mobile stations in the same frequency band, and wherein the spectrum of the radio signals transmitted by the base station to the repeater station is reversed relative to the spectrum of the radio signals retransmitted by the repeater station to the mobile stations. Because of the spectrum reversal, any signal transmitted by the base station to a repeater station will be incapable of interpretation by the mobile stations. It is thus possible to make use of multiple relatively cheap repeater stations to cover a large geographical area.

The saving achieved is particularly appreciable when the spectrum reversal at the repeater station is performed without regenerating the digital signal, by using radio transposition means.

If it is desired to avoid modifying the hardware structure of the base station, it is possible, prior to modulating the digital signal to be transmitted by the base station, to perform a logical transformation on said signal which, after modulation about an offset frequency, is equivalent to reversing the spectrum of the radio signal. Under such circumstances, the method can then be implemented at the base station merely by modifying the software of the radio interface.

In its second aspect, the invention provides a repeater station comprising first transmission and reception means for communicating with a base station, second transmission and reception means for communicating with the mobile stations, a first line for processing the radio signals received by the first transmission and reception means prior to retransmission by the second transmission and reception means, and a second line for processing the radio signals received by the second transmission and reception means prior to retransmission by the first transmission and reception means, said first line including at least one supradyne transposition circuit for performing spectrum reversal of the radio signal.

Finally, the invention provides a radiotelephone communications network comprising at least one telephone exchange station, base stations connected to the telephone exchange station for providing a digital radiotelephone interface, and repeater stations for receiving radio signals transmitted by at least one of the base stations and for retransmitting radio signals in the same frequency band to the mobile stations, wherein the base station and the repeater station are organized so that the spectrum of the radio signal emitted by the base station and received by the repeater station is reversed relative to the spectrum of the radio signals retransmitted by the repeater station to the mobile stations.

DESCRIPTION OF THE DRAWINGS

The sole FIGURE of the accompanying drawing is an overall diagram of a radiotelephone communications network implementing the invention.

DESCRIPTION OF A PREFERRED EMBODIMENT

The network comprises a conventional type of telephone exchange station 1 connected by wire telephone lines 2 to fixed base stations 3, 13, and 23. The fixed base stations provide a radiotelephone interface between the telephone link with the central station 1 and the radio link established with mobile stations 6. The base stations are fitted with omnidirectional transmission and reception antennas 7a, 7b enabling direct radio communication with the mobile stations 6.

To ensure extended territorial coverage, the network includes repeater stations 14 and 24. Some of the fixed base stations 13 and 23 are fitted, in addition to their omnidirectional antennas 7a and 7b, with directional antennas 7 for communicating with one or more repeater stations 14, 24 associated therewith. To simplify the drawing, only one repeater station is shown per base station. However, in general, there will be a plurality of repeater stations per base station. A base station may include an omnidirectional antenna for communicating with all of the repeater stations associated therewith. Each repeater station 14, 24 has a directional antenna 8 for interchanging radio signals with the base station 13, 23 associated therewith, a transmission antenna 9 for transmitting radio signals to mobile stations 6, and a reception antenna 10 for receiving radio signals from mobile stations 6.

Each repeater station 14, 24 includes a first line 11, 21 between its antennas 8, 9 to retransmit the radio signals it receives from the base station 13, 23 towards the mobiles 6, and a second line 12 between its antennas 10 and 8 to retransmit the signals it receives from the mobile station 6 to the base station 13, 23. Each of these lines includes an amplifier 30 and is connected to the antenna 8 via a duplexer 31.

In the application of the invention to GSM (Global System for Mobile Communications) type communications, the radio signals going to the mobile stations are transmitted in the frequency band 890 MHz to 915 MHz which is subdivided into 124 carrier channels, and the radio signals transmitted by the mobiles lies in the frequency band 935 MHz to 960 MHz. To avoid having to isolate the antenna 8 from the reception antenna 10, the second line 12 of each repeater station includes an infradyne transposition circuit comprising an oscillator 26 and a mixer 27 which offsets the frequency of signals retransmitted to the base station 13, 23 relative to the frequency of signals received from the mobile stations 6.

Merely using an analog infradyne transposition circuit for the first lines 11 and 21 would suffice to decouple the antennas 8 and 9, however that would not be satisfactory since a mobile station 6 could then intercept a radio call set up between a fixed base station 13, 23 and a repeater station 14, 24 that was not intended for that mobile. That is why, according to the invention, the transposition performed in the first line 11, 21 of each repeater station corresponds to spectrum reversal.

Such spectrum reversal is performed without regenerating the transmitted digital signal, by using radio transposition means. In the example of station 14 shown in the FIGURE, the first line 11 includes a single supradyne transposition circuit comprising an oscillator 28 and a mixer 29 associated with a lowpass filter. The frequency F of the oscillator 28 is selected to transpose the frequency channel of calls going to the repeater station into another frequency channel of the same band that is allocated to calls from the repeater station to the mobile stations. This frequency F is the same for all of the repeater stations associated with the same base station, but it could be different for repeater stations associated with different base stations.

In the example of the station 24 shown in the FIGURE, the first line 21 comprises, in series: a supradyne transmission circuit comprising an oscillator 28a and a mixer 29a associated with a lowpass filter, and an infradyne transposition circuit comprising an oscillator 28b and a mixer 29b associated with a highpass filter. The respective frequencies $f_1$ and $f_2$ of the oscillators 28a and 28b are such that their sum is equal to the above-defined frequency F.

The base station 13, 23 associated with each repeater station is organized to transmit a reversed spectrum radio signal via its antenna 7. This can be achieved as shown diagrammatically in the FIGURE for the base 23: between the conventional radio modem (not shown) and the antenna 7, there is provided a transmit line 41 provided with transposition means 48a, 49a, 48b, 49b identical to the means 28a, 29a, 28b, 29b of the first line 21 in the repeater station 24. These transposition means also perform spectrum reversal. In addition, a receive line 42 is provided between the antenna 7 and the modem. The receive line is provided with transposition means 46, 47 that perform the inverse transposition to the transposition of the means 26, 27 of the second line 12 of the repeater station 24.

Thus, since the modem operates in the same way as in a conventional base station, the spectrum of the transmitted radio signal is reversed relative to that which the mobile stations 6 are capable of interpreting. Even if the reversed spectrum radio signal is picked up by a mobile station, it will be unintelligible, e.g. because it will not be carrying the signature bits of a radio telephone communications network. It is only after the spectrum has been reversed again by the repeater station that the signal becomes interpretable by mobile stations.

Another way of achieving spectrum reversal in the base station 13 consists, prior to modulation, in performing a logical transformation on the digital signal to be transmitted such once the signal transformed in this way has been modulated about an offset carrier frequency it is equivalent to spectrum reversal of the radio signal. In the particular case of GSM, after pre-encoding, the signal is modulated using Gaussian minimum shift keying (GMSK). The logical transformation can then consist in sequentially inverting every other bit of the digital signal prior to pre-encoding, which is easily done merely be means of an EXCLUSIVE-OR operation between the digital signal and a binary signal constituted by alternating "0" and "1". If, instead of transmitting the signal about a carrier frequency f, it is transmitted about a carrier frequency F-f, where F is the transposition frequency of the repeater stations associated with the base station under consideration, as defined above, then the looked-for spectrum reversal is achieved.

I claim:

1. A method of transmitting digital signals by radio over a predefined frequency band between a base station and mobile stations, said method comprising the steps of:

transmitting radio signals from the base station to at least one repeater station; and at said at least one repeater station, receiving said radio signals, reversing the spectrum thereof within the same frequency band to produce radio signals with a reversed spectrum, and retransmitting said radio signals with said reversed spectrum to the mobile stations.

2. A method according to claim 1, wherein spectrum reversal at the at least one repeater station is performed by radio transposition means without regenerating the digital signal.

3. A method according to claim 1, wherein prior to modulating digital signals for transmission by a base station, said signals are subjected at said base station to a logical transformation which, after modulation about an offset frequency, is equivalent to spectrum reversal of the radio signals.

4. A repeater station comprising: first transmission and reception means for communicating with a base station of a radiocommunications network, second transmission and reception means for communicating with mobile stations, a first line for processing the radio signals received by the first transmission and reception means prior to retransmission by the second transmission and reception means, and a second line for processing the radio signals received by the second transmission and reception means prior to retransmission by the first transmission and reception means, said first line including at least one supradyne transposition circuit for performing spectrum reversal of the radio signals.

5. A radiotelephone communications network comprising: at least one telephone exchange station, base stations connected to the telephone exchange station for providing a digital radiotelephone interface, and repeater stations for receiving radio signals transmitted by at least one of the base stations and for retransmitting radio signals in the same frequency band to mobile stations, at least one repeater station of said repeater stations including spectrum reversal means for providing that the spectrum of the radio signal emitted by said at least one base station and received by said at least one repeater station is reversed relative to the spectrum of the radio signals retransmitted by said at least one repeater station to the mobile stations.

* * * * *